United States Patent [19]

Rotunda

[11] 4,183,130
[45] Jan. 15, 1980

[54] METHOD OF ASSEMBLY OF A SOLAR ENERGY DEVICE INCLUDING A DUCT-COLLECTOR

[76] Inventor: Orlo Rotunda, 1714 9th St., Greeley, Colo. 80631

[21] Appl. No.: 793,045

[22] Filed: May 2, 1977

[51] Int. Cl.² .......................................... B23P 15/26
[52] U.S. Cl. .............................. 29/157.3 R; 126/270
[58] Field of Search .................. 126/270, 271; 52/407, 52/481, 775, 781, 738, 809; 29/157.3 R, 526 R

[56] References Cited

U.S. PATENT DOCUMENTS

| | | | |
|---|---|---|---|
| 3,314,415 | 4/1967 | Rowekamp | 126/271 |
| 3,937,208 | 2/1976 | Katz et al. | 126/271 |
| 3,980,071 | 9/1976 | Barber, Jr. | 126/271 |
| 4,003,363 | 1/1977 | Grossman | 126/270 |
| 4,038,967 | 8/1977 | Stout et al. | 126/271 |
| 4,068,361 | 1/1978 | Root | 29/157.3 R |

FOREIGN PATENT DOCUMENTS 23624  10/1911  United Kingdom ..................... 60/641

Primary Examiner—Allen M. Ostrager
Assistant Examiner—Stephen F. Husar
Attorney, Agent, or Firm—Horace B. Van Valkenburgh; Frank C. Lowe

[57] ABSTRACT

A series of double pane glass panels of a standard length and width, thereby decreasing cost, are installed between a pair of parallel studs in partially upright position, with a longitudinally flanged spacer strip or strip sections attached to the inside edge of each stud for spacing the panels from a single, hollow duct-collector, or a series of connected, hollow duct-collector sections which correspond in length and width to the panels. The duct-collector acts not only as a conduit for movement of air through the device, but is also specially constructed to simultaneously transfer heat to the air. Thus, the front wall of the duct-collector is dimpled inwardly, with the outside and inside surfaces of the front wall being black and the remaining inside walls of the duct-collector sections having a bright, reflecting finish. The upper and lower ends of the duct-collector or sections are closed, with an inlet at the bottom and an outlet at the top, extending through insulation which is rearwardly of the duct-collector or sections and is held in place by a rear panel attached to the studs. Special connectors for adjacent ends of the panels and for abutting ends of the hollow duct-collector sections, when used, are also disclosed. The duct-collector sections, connectors and spacer strip sections are adapted to be sold in kit form, to further decrease the cost.

6 Claims, 11 Drawing Figures

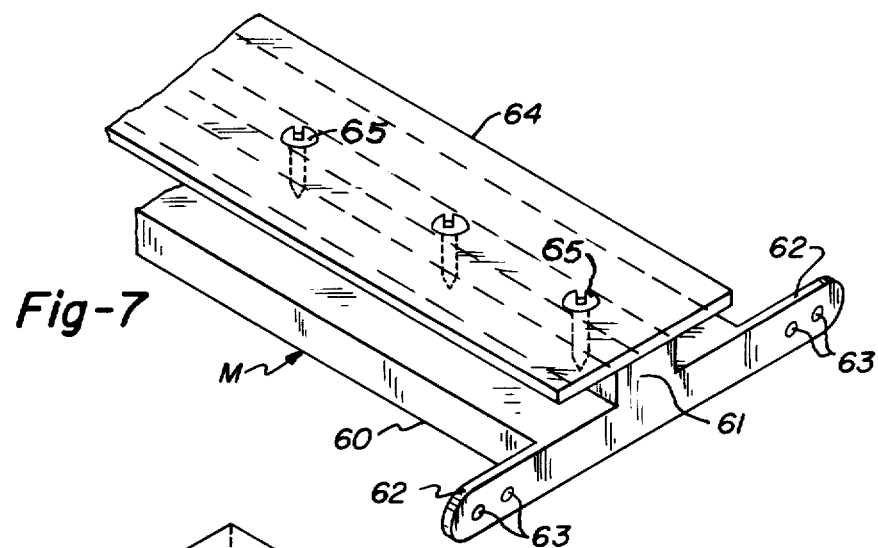
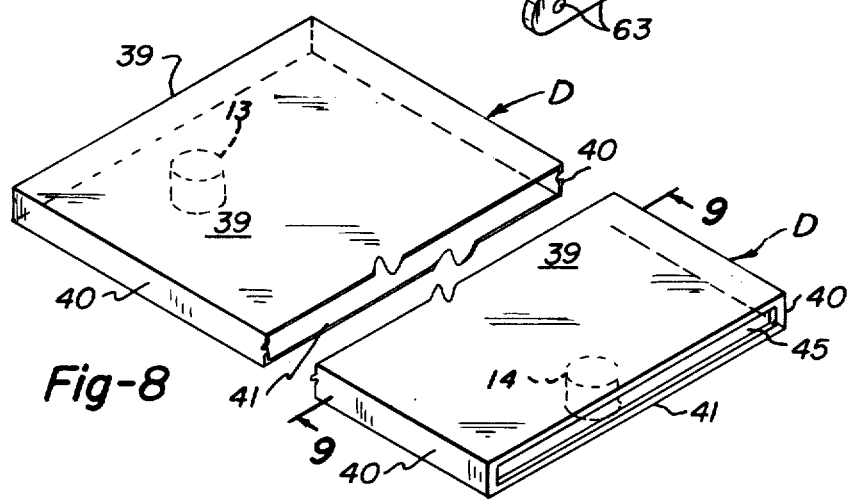
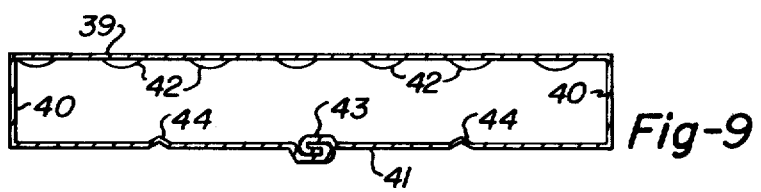
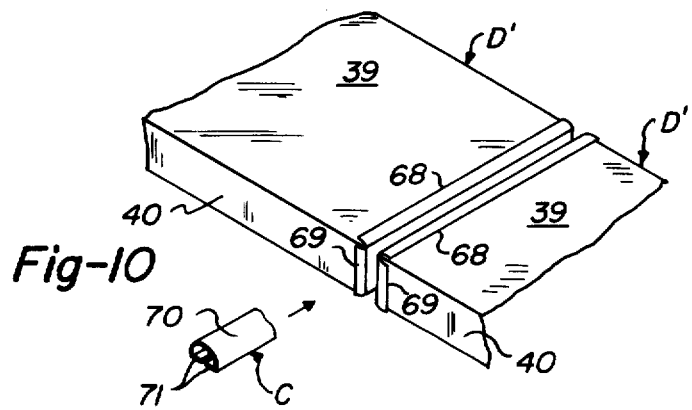
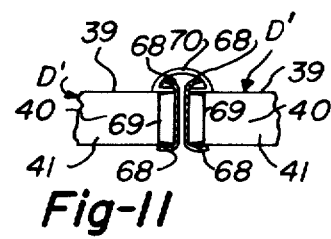

METHOD OF ASSEMBLY OF A SOLAR ENERGY DEVICE INCLUDING A DUCT-COLLECTOR

This invention relates to a method of assembly of a solar energy device, and particularly to such a solar energy device which includes a duct-collector.

Previous solar energy collection devices have normally been unduly expensive, when an undesired heat loss is to be avoided. Also, such solar energy collection devices have normally been built in a size corresponding to the amount of solar energy to be collected, with an attendant increase in cost, due to the special construction necessary for the manufacture of each collector.

The method of the present invention avoids these undue costs by utilizing related parts of a standard size and which may include sections which may be placed end to end to produce a desired length, as well as in two or more adjacent rows. To avoid undue heat loss, it is desirable to use a double walled transparent panel, to permit the sun's rays to be directed against a collector unit beneath the panel. The most satisfactory transparent panels are formed of double wall tempered glass, sealed together around the side and end edges after elimination of moisture between the panes, but these glass panels are normally the single most expensive item of a solar energy collector. However, this cost is reduced to a minimum by using units which correspond to the length and width of conventional double glass panels, which are normally manufactured for use in standard size windows. These presealed, production double tempered glass panels are manufactured in a standard length, i.e., 76 inches, but in three different widths, i.e., 28 inches, 34 inches and 46 inches. Two or more of these panels may be placed end to end, parallel to and about one inch from a special hollow duct-collector formed of sheet metal, about four inches thick, and not only adapted to transfer air for heating, but also to provide an unimpeded channel within the duct-collector for flow of air upwardly for heating. The duct-collector may have a length corresponding to the total length of the panels, or may be formed of sections which have the same lengths as the glass panels and are connected end to end to provide the hollow duct-collector desired. Special connectors are used between adjacent glass panels and other special connectors may be used to connect a series of duct-collector sections, when used.

The panels and duct-collector are supported by and mounted between studs or rafters, spaced apart a distance corresponding to the width of the section and having a length sufficient to accommodate the two, three or four panels and the duct-collector of corresponding length, together with any additional length necessary for connection to joists or rafters, if part of a roof. A number of units are normally placed in side by side relation to increase the total area receiving solar radiation, with studs correspondingly placed in spaced, parallel relation. In the method of this invention, a pair of spacers for each unit are mounted in opposed positions on the inside of the studs. These spacers have a special essentially zigzag formation, not only to receive the conventional size of double pane glass panels, but also the hollow duct-collector, which facilitate the installation of both the double pane glass panels and also the duct-collector sections. Such formation includes a front flange for abutting the front of the stud, a first lateral flange extending toward the opposite stud and spaced to receive the double pane glass panel, a second lateral flange connected to the first and providing an air space adjacent the glass panel, and rear flange means spaced from the second flange to provide a space receiving the duct-collector, whose thickness corresponds to the latter space. These spacers are readily formed from sheet metal, in lengths corresponding to the length of two, three and four glass panels, or in lengths corresponding to the duct-collector sections, when used. An effective flow of the air to be heated, through the duct-collector of each unit, is obtained by a blower connected to a lower manifold connected with the lower end of each row of duct-collectors, with discharge through an upper manifold connected with the upper end of each row of duct-collectors. In addition to the thermal glass insulation on the front side of each unit, the supporting studs or rafters are themselves insulated, while a thick layer of effective insulation is provided on the rear side of the duct-collector.

The advantages and other novel features of this invention will become apparent from the description which follows, taken in conjunction with the accompanying drawings, in which:

FIG. 7 is a perspective view, on an enlarged scale, of a portion of a mullion for coupling glass panels.

FIG. 8 is a condensed perspective view, on a reduced scale, of a duct-collector of the device.

FIG. 9 is a cross section of the duct-collector, taken along line 9—9 of FIG. 8, on an enlarged scale.

FIG. 10 is a fragmentary perspective view of portions of two abutting duct-collector sections, in position to be joined across adjacent edges by a connection strip, shown fragmentarily.

FIG. 11 is a fragmentary side view of the duct-collector sections of FIG. 10 joined across the front by the connection strip.

Figure 1:
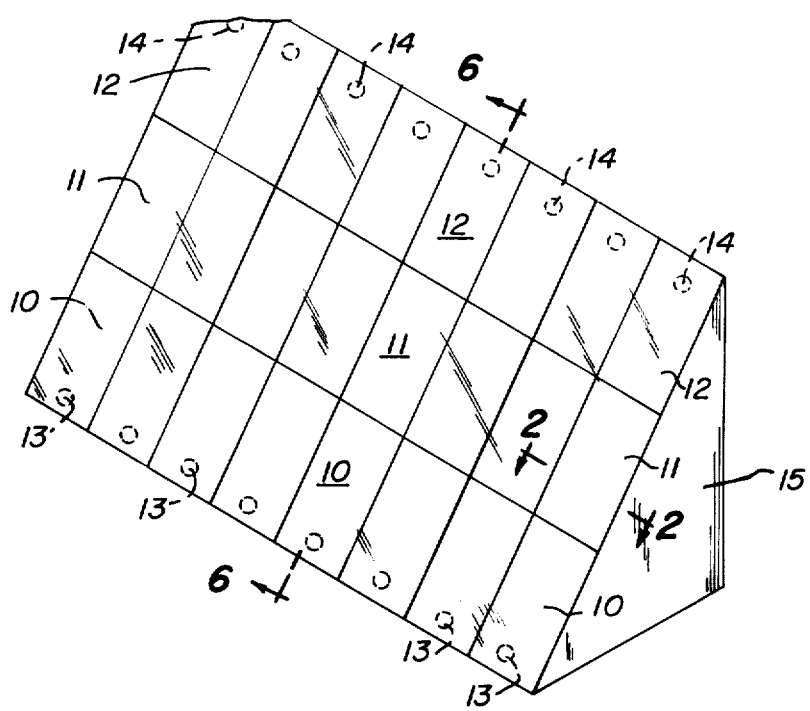
FIG. 1 is a diagrammatic perspective view of a solar energy device including a duct-collector, constructed in accordance with the method of this invention.

As shown in FIG. 1, a solar energy device including a duct-collector and assembled by the method of this invention may comprise a series of side-by-side rows of heat collector units, each unit normally comprising more than one panel section, such as a lower section 10, an intermediate section 11 and an upper section 12. Each unit is provided with an inlet 13 adjacent the bottom, which extends to the duct-collector from the rear, and an outlet 14 adjacent the top for heated air, which extends rearwardly from the respective duct-collector. An end wall 15, at each end of the device of FIG. 1, is generally triangular in shape to provide a vertical edge at the rear and to slope at the front to correspond to the angularity of the sections, which may extend at 60° to the horizontal for a 40° latitude, in order to receive a maximum average heat from the winter sun. For higher or lower latitudes, the angle may be varied.

The number of sections in a vertical series may, of course, be more or less than the three illustrated, with each of the sections being approximately 76 inches in length and the three sections shown thus having a total length of approximately 228 inches, or 19 feet. Instead of utilizing a greater length of unit, if additional heat collection capacity is desired in a vertical arrangement, it would normally decrease the problem of producing an adequate air flow through the duct-collectors by utilizing additional but superimposed units, with an air inlet at the bottom and an air outlet at the top of each of two units, one above the other, such as each having two conventional double pane glass panels. The width of the sections 10, 11 and 12 may correspond to the normal production width of the double pane glass panels, i.e., of 28 inches, 34 inches or 46 inches.

Figure 2:
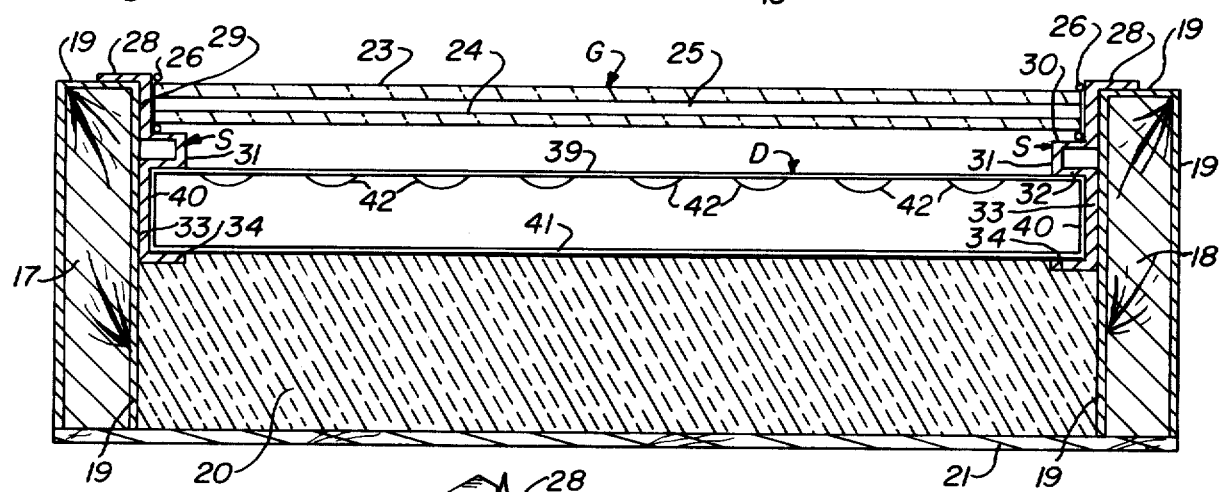
FIG. 2 is a lateral cross section of one unit of the solar device of FIG. 1, taken along line 2—2 of FIG. 1 on an enlarged scale.

As illustrated in FIG. 2, each of the units may include one or more presealed glass panels G of standard length in spaced relation to a special duct-collector D, extending the full length of the glass panels G. At each side, a spacer S receives and positions not only the glass panels G, but also the duct-collector D, while the spacer S may extend for the length of the unit. The double pane glass panels G utilize tempered glass, with each pane being 3/16 inch in thickness and with a ¼ inch space between panes, each panel thus having a total thickness of ⅝ inch. The two panes are connected around the edges in a conventional manner, as by edging strips interfitting with the glass panes, while the space between the panes is treated to remove moisture.

The parts making up a unit of a row are installed between a pair of studs or rafters 17 and 18, each provided with a heavy aluminum foil insulating layer 19, to keep unnecessary heat away from the studs or rafters. A relatively thick layer of insulation 20 is disposed behind duct-collector D, with the rear side being closed by a panel 21, such as gypsum board, or if desired, plywood. One or more rows of units may be installed on a suitable foundation therefor on the ground, or the units may be mounted on top of a flat roof or form an integral part of a sloping roof of the building to be heated.

Each glass panel G includes an outer pane 23, an inner pane 24 and a space 25 therebetween, with the edges of the panes 23 and 24 being sealed in a conventional manner and preferably moisture substantially eliminated from the space 25. The ends of the glass panels G extend between the spacers S mounted on the inside of the studs or rafters 17 and 18, with a seal 26, as of silicone, between the side of each glass panel G and the spacer S.

Figure 3:
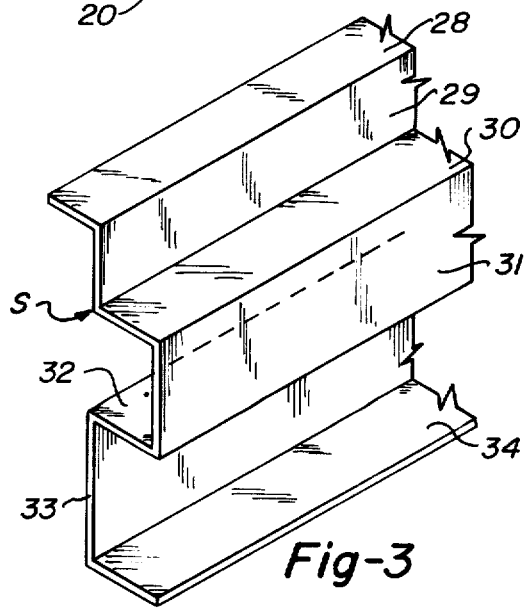
FIG. 3 is a perspective view of a portion of a spacing strip which produces numerous advantages of the method of this invention, on a further enlarged scale.
Figure 4:
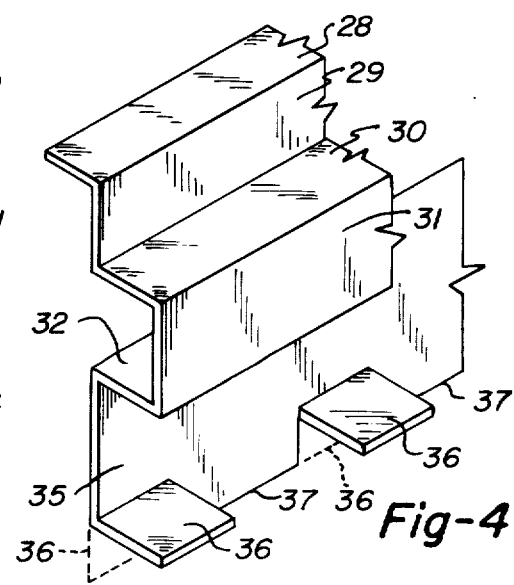
FIG. 4 is a similar perspective view of an alternative spacing strip.
Figure 5:
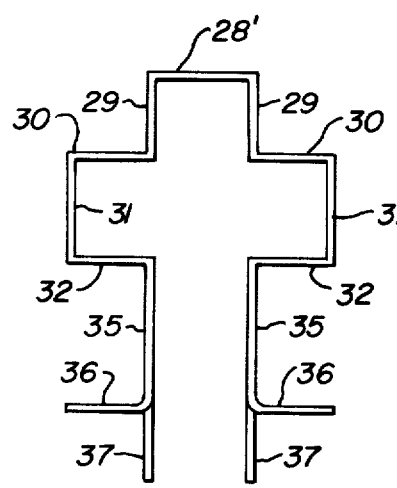
FIG. 5 is an end view of a dual spacing strip, corresponding to FIG. 4 but adapted to fit over a stud and provide a spacing strip at each side.

As illustrated in FIG. 3, the spacer S may include a front flange 28 which engages the front edge of the corresponding stud or rafter 17 or 18, as well as a first longitudinal flange 29 which flanks the sides of the glass panels G. A first lateral flange 30 is disposed rearwardly of the glass panel, while a second longitudinal flange 31 provides a space between the glass panel and the duct-collector D. A second lateral flange 32 is disposed in front of the duct-collector and a third longitudinal flange 33 corresponds in width to the thickness of the duct-collector D, flanking the side thereof. A rear or third lateral flange 34 abuts the rear of the duct-collector, which normally rests against it, due to its inclination. An alternative spacer construction, shown in FIG. 4, is provided with front flange 28, longitudinal flanges 29 and 31 and lateral flanges 30 and 32, but a longitudinal flange 35 extends rearwardly a greater distance then flange 33 of FIG. 3, so that a spaced series of tabs 36 may be separated by slits from portions 37 of flange 35. Conveniently, the tabs 36 are left in the plane of flange 35, in the dotted position, until attachment to the studs and placement of duct-collector D between the opposed spacers, up to lateral flange 32, whereupon a desired number of tabs 36 may be bent upwardly against the rear of the duct-collector, to the full line position shown. A further alternative spacer construction, shown in FIG. 5, includes a front flange 28' of two spacers joined together, so that front flange 28' will overlie the front edge of a stud, and the two spacers, formed as mirror images, will extend rearwardly along the opposite sides of the stud. The dual spacer construction of FIG. 5 is utilized for studs which form a common wall between two units.

Figure 6:
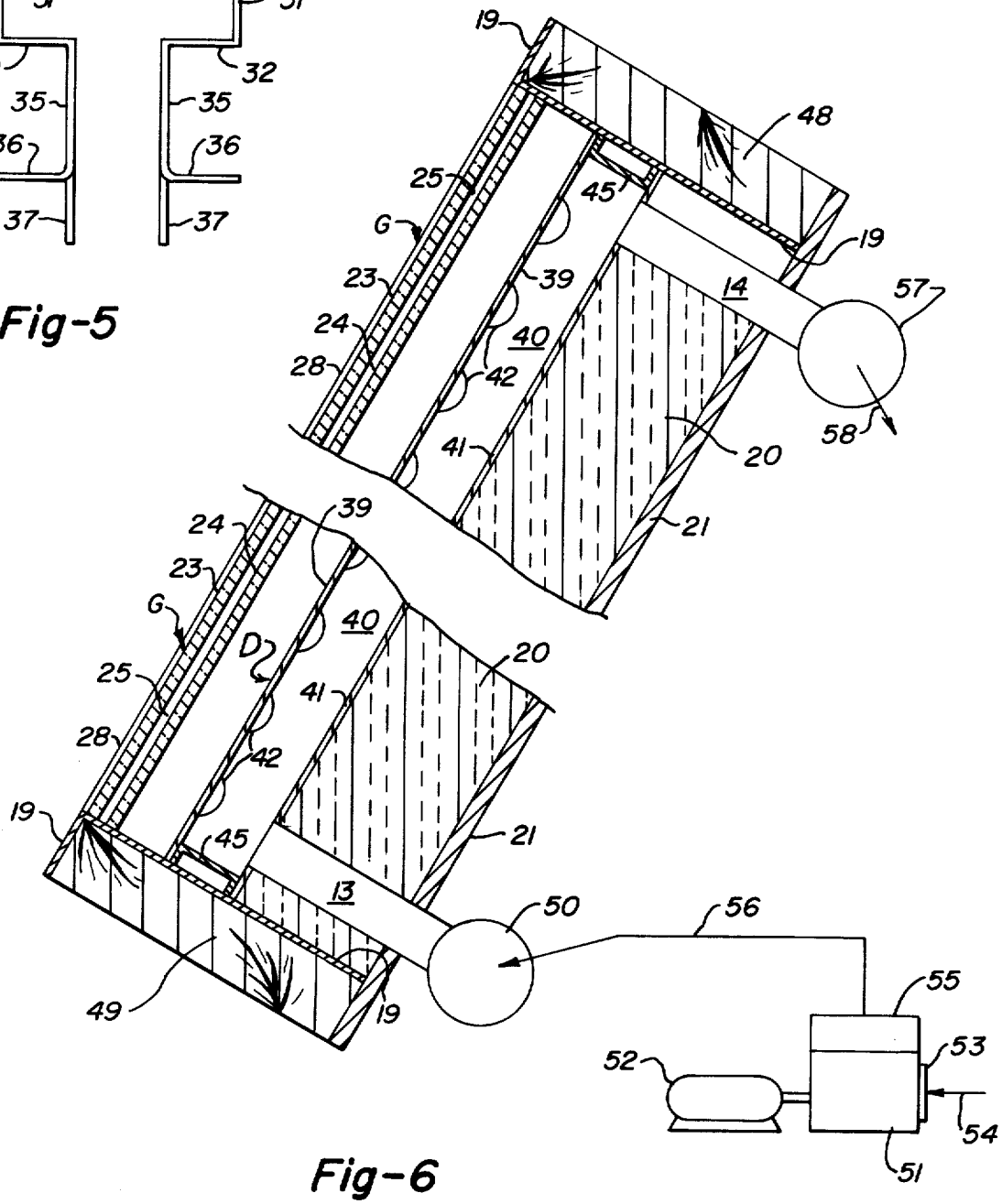
FIG. 6 is a condensed vertical section of one unit of the device, taken along line 6—6 of FIG. 1, on an enlarged scale, and showing an air pump and circulation to the duct-collector diagrammatically.

A unitary duct-collector D, as in FIGS. 2, 6, 8 and 9, includes a front wall 39 having a width corresponding to the standard width of the glass panel G and a pair of side walls 40 which connect with a rear wall 41, to provide a depth of the duct-collector on the order of 3½ inches to 5 inches. The length of the duct-collector D, as indicated previously, corresponds to the total length of the panels G, depending on the number used, while a series of indentations 42, convex on the underside, are provided in front wall 39, for a purpose described below. As in FIG. 9, the duct-collector may be closed by a lock seam 43 in the rear wall 41, which avoids interference with the formation of indentations 42, if in the front wall, or interference with a spacer S, if in a side wall. One or more reinforcing longitudinal ridges 44 may also be formed in the rear wall, as on opposite sides of lock seam 43. The opposite ends of the hollow duct-collector may be closed by end walls 45, which are essentially elongated strips with lateral flanges fitting inside the duct, as in FIG. 6, for attachment by sheet metal screws, or any other suitable manner. Air inlet pipe 13, as in FIGS. 6 and 9, is connected to the rear wall of the duct collector adjacent the bottom and an outlet pipe 14 adjacent the top.

The sun's rays passing through each double pane glass panel G heat the space between the glass panel and the duct-collector and also, in part, impinge against the duct-collector. The front surface of the front wall 39 of the duct-collector D is preferably painted black with a heat resistant paint, to absorb as much heat as possible and transmit it through the front wall, for radiation from the rear side of the front wall, to heat the air passing through the duct-collector. To increase this heating effect, the indentations 42, convex on the underside, increase the area from which heat is radiated into the inside of the duct-collector. The inner side of the front wall 39 is also preferably painted black, to increase the radiation rate. The inner surfaces of the side walls 40 and rear wall 41 have a bright finish, in order to reflect heat rays impinging thereon against air in the duct-collector passage. If the duct-collector D is formed of galvanized sheet metal, the inside surfaces may be found to be satisfactory; otherwise, a suitable reflecting layer, such as aluminum paint, may be used. The indentations 42 may be essentially partly spherical dimples spaced a diameter apart, as in staggered rows. These dimples and inside painting are conveniently formed and done before the duct-collector is assembled, as by bending a strip of a suitable length, to form the front, rear and side walls, and closing the duct-collector by the lock seam 43.

As illustrated in FIG. 6, the upper end of each unit may be closed by a top beam 48 and the lower end by a bottom beam 49, each of which may extend across the corresponding ends of the studs 17 and 18. Each beam 48 and 49 may be provided with an insulation layer 19 on the front edge and the side adjacent the unit. The inlet 13 may extend from a manifold 50 through panel 21 and insulation 20 to the rear wall 41 of the duct-collector. Manifold 50 may be supplied with air in a suitable manner, as by a blower 51 driven by a motor 52, the blower having an inlet 53 to which air is supplied, indicated by the arrow 54, and an outlet 55 from which a conduit or pipe extends to the manifold 50, as indicated by the line 56. The air flowing upwardly from inlet 13 through the duct-collector D is heated during its upward passage and is discharged through the outlet 14 which, similar to the inlet, extends from rear wall 41 through the insulation 20 and the rear panel 21. Each outlet 14 connects with a manifold 57, from which the heated air is discharged, as indicated by the arrow 58. The heated air may be transferred from manifold 57 into a room to be heated, from which air is withdrawn and returned to the blower 51, for reintroduction into the manifold 50. Or, the heated air from manifold 57 may be directed to a heat storage space containing, for instance, rocks of an appropriate size for storing heat, during periods of absorption of solar heat by the system in excess of the demand for the heat. Later, when the heat production is less, air may be passed through the heat storage space to recapture the heat.

The successive glass panels are, of course, held in position by the spacers S. In order to hold them more securely, as by connecting two abutting glass panels, one above the other, a mullion M of FIG. 7 is used. The mullion M includes a T-shaped base 60 having an upstanding, integral center bar 61, so that the base 60 on each side of bar 61 may engage the rear of the adjacent glass pane panels G, with bar 61 between the ends of the panels. At each end, base 60 is provided with perpendicularly extending flanges 62 having holes 63 for screws or nails for attachment of the mullion to the stud on each side of the panels. A cover plate 64 may engage the front of the respective glass pane panels, as through being held against the panels by screws 65.

Particularly when the duct-collector is sold in kit form, a series of duct-collector sections D', as in FIG. 10, may be made. These duct-collector sections correspond in length to the panels G and each end of each duct-collector section D' is initially open, either for attachment to the next duct-collector in series, or closed by an end wall 45, conveniently mounted in the top of the upper duct-collector section and the bottom of the lower duct-collector section. A suitable connector for the intermediate ends of the abutting duct-collector sections should be provided to produce an unimpeded channel within the duct-collector. Thus, the intermediate end edges of the duct-collector sections D' may be provided with reversely bent, front wall and rear wall attachment flanges 68 and similar side wall flanges 69. As in FIGS. 10 and 11, a connector C may be utilized for attaching the opposed flanges 68 and similarly the opposed flanges 69 of abutting duct collectors together. Each connector C includes a convex, arcuate strip 70 whose side edges terminate in flanges 71 extending toward each other. The length of a connector C for the flanges 68 should correspond to the width of the duct, while the length of a connector C for flanges 69 should correspond to the depth of the duct. By slipping the flanges 71 beneath the opposed flanges 68, as in FIG. 11, a connector may be driven into position to connect the front walls of two abutting duct-collectors. Similarly, a connector C may be driven into position engaging flanges 69 at the rear, to connect the rear walls of the adjacent duct-collectors, while the side connectors are utilized in the same manner. If desired, the side connectors may be provided with extending lips for displacement into the adjacent end of a front or rear connector, as by hammering, to provide an air seal, while a suitable calking compound may be used with each connector C and a gasket between the side wall connectors and the front and rear wall connectors.

In installing a solar device in accordance with the method of this invention, the studs or rafters 17 or 18 may be erected and secured in position, with the spacers S, or alternative constructions, previously or then mounted on the studs or rafters. When the spacer of FIG. 4 or the spacer of FIG. 5 is used, the duct-collector may be slipped into position from the rear. When used with the spacer S of FIG. 3, each duct-collector section D' may be slid, one by one, into position, with the adjacent sections being coupled by connectors C just before the second duct-collector section enters the space therefor. However, when the spacers of FIG. 4 or 5 are used and the tabs 36 left in the plane of flange 35, the duct-collector sections may be assembled as a unit and pushed from the rear between the spacers, after which the tabs 36 may be bent upwardly. The duct-collector D or sections D' may further be attached to the studs or rafters 17 or 18 by L-shaped metal strips secured by sheet metal screws to the duct-collector and also secured by appropriate screws to the stud or rafter, rearwardly of the duct-collector. After installation of the duct-collector, including the inlets 13 and outlets 14, the insulation 20 is filled in behind the duct-collectors and the rear panel 21 attached in position. The top beam 48 and bottom beam 49 may be initially installed when the spacers of FIG. 4 or 5 are used, but the top beam 48 may wait until the duct-collectors and insulation are installed, when the spacer of FIG. 3 is used. Then, the double pane glass panels G are installed from the front, with the lowermost first, and an ample supply of silicone sealant placed on the spacers S or alternatives, to form essentially a bead into which the edges of the panels are forced. After placement in this manner, additional sealant is spread between the outer edges of the glass panels and the spacers. As the additional glass panels are installed in the same row, each being connected to the next lower panel by a mullion M, the silicone sealant is also spread between the ends of the glass panels and the mullion.

The solar device to be assembled by the method of this invention may be manufactured partly in kit form, for use with double pane glass panels of standard width. Such a kit would include an inlet and an outlet duct-collector section, one or more intermediate duct-collector sections, and spacer strips of a length corresponding to the duct-collector sections. Other items include the mullions M for connecting the panels P, and the duct connectors C, along with miscellaneous hardware items, such as sheet metal screws. The purchaser of the kit would secure the panels P, the studs 17, 18, insulation 20 and rear panel 21, all normally readily available. Manifolds, a blower and air lines would also need to be secured.

As will be evident, a solar device to be assembled by the method of this invention is adaptable for construction to recover various amounts of solar energy through increasing the number of double pane glass panels and corresponding duct-collectors utilized, by either increasing the number of panels in alignment, or by increasing the number of rows of panels and duct-collectors, or both. The use of standard lengths and widths of double pane glass panels permits considerable savings to be made in the purchase of the normally most expensive item of the unit. In this system, the prime factors are economy and efficiency. A selective surface approach is sacrificed for the reduction of losses in conduction, convection and static pressure, rather than radiation. The system is designed to operate at a temperature of approximately 60° to 65° C., avoiding the losses by radiation present if the system were operating in the range of 70° to 90° C. Economy is effected in this installation by using the rafters or studs as an integral part of the system to contain the duct-collector itself. Additional economy is obtained through the use of standard sizes of double pane glass panels.

The width of teh standard double pane glass panels determines the spacing between the rafters or studs, and the size of the rafters or studs is again determined by the load, in turn dependent upon the width of the double pane glass panels. It is necessary, of course, to insure that there will be sufficient square foot area in the roof or wall installation to accommodate not only the length of the rows, but also the total width of the rows.

Although a preferred embodiment of the method and certain variations in assembly or construction of the parts has been illustrated and described, it will be understood that other embodiments may exist and that various changes may be made therein, all without departing from the spirit and scope of this invention.

What is claimed is:

1. A method of assembly of a solar energy device which includes at least one double pane glass panel of a standard width and length and presealed along the ends and edges, which comprises:
    installing a pair of studs in parallel, at least partially upright position and spaced apart a distance corresponding to the width of said panel;
    attaching to the inside of the respective studs a spacer having a front flange engaging the front of the corresponding stud, a first lateral flange extending toward the opposite stud and spaced rearwardly from said front flange a distance corresponding to the thickness of said presealed panel, a second lateral flange extending toward the opposite stud and spaced rearwardly from said first lateral flange a first predetermined distance, means spaced from said stud connecting said first and second lateral flanges, and rear flange means spaced rearwardly from said second lateral flange a second predetermined distance;
    installing each said presealed panel against said first lateral flanges of said spacers so as to occupy the space bounded at each side by said front and first flanges;
    installing at least one section of an elongated, hollow duct-collector having an essentially rectangular cross section in a position at the rear sides of said second lateral flanges and essentially abutting said rear flange means, each said duct section having a length and width corresponding to the length and width of a presealed panel and a thickness corresponding to the second predetermined distance;
    connecting to the lower end of said duct-collector means for effecting the upward passage, through said duct-collector, of a gas to be heated; and
    connecting to the upper end of said duct-collector means for withdrawal of the heated gas.

2. A method as defined in claim 1, wherein:
    said rear flange means of each said spacer comprises a third lateral flange extending toward the opposite stud and spaced from said second lateral flange said second predetermined distance; and
    said duct-collector is installed by sliding between said second and third lateral flanges.

3. A method as defined in claim 1, wherein:
    said rear flange means comprises a series of spaced tabs extending rearwardly on each said spacer at a position spaced said second predetermined distance from said second lateral flange; and
    said duct-collector is installed by placement from the rear against said second lateral flanges and bending said tabs forwardly against said duct-collector.

4. A method as defined in claim 3, which includes:
    installing a series of said panels between corresponding spacers attached to said studs;
    connecting a corresponding series of duct sections end to end; and
    installing said series of duct sections between said spacers.

5. A method as defined in claim 1, which includes:
    installing a series of said panels between corresponding spacers attached to said studs;
    connecting a corresponding series of duct sections end to end;
    installing a series of duct sections between said spacers;
    closing the upper and lower ends of said connected series of duct sections;
    connecting an inlet pipe to the rear of the lowermost duct section and adjacent the lower end thereof; and
    connecting an outlet pipe to the rear of the uppermost duct section and adjacent the upper end thereof.

6. A method as defined in claim 5, which includes:
    placing insulation at least on the front edges and inside edges of said studs, said studs extending rearwardly beyond said duct-collector;
    placing insulation in the space between said studs rearwardly of said duct-collector; and
    installing at least one panel on the rear edges of said studs, with said inlet and outlet pipes extending through said insulation and panel.

* * * * *